Dec. 9, 1969 J. N. WRIGHT 3,483,541

MEMORY PROTECTION APPARATUS

Filed Aug. 25, 1966 2 Sheets-Sheet 1

INVENTOR.
JOHN N. WRIGHT
BY
Ronald W. O'Keefe
ATTORNEY

United States Patent Office 3,483,541

Patented Dec. 9, 1969

3,483,541

MEMORY PROTECTION APPARATUS

John N. Wright, Scottsdale, Ariz., assignor to General Electric Company, a corporation of New York Filed Aug. 25, 1966, Ser. No. 575,139

Int. Cl. G11b 5/00

U.S. Cl. 340—174.1 8 Claims

ABSTRACT OF THE DISCLOSURE

A circuit for protecting a magnetic memory from overwriting selected memory portions through faulty selection of the memory writing transducers. Actuation of one each of first and second sets of memory selection switches enables a particular transducer to be energized by a current source for writing binary information on the memory surface. Individual low-impedance circuits switchably couple the current source and a selected one of the second set of switches. Closing a low-impedance circuit couples the current source through one of the second set of switches to disable at least the memory transducers controlled thereby.

This invention relates to information storage apparatus and, in particular, to digital information storage apparatus employing a moving magnetic record medium.

In computer systems employing magnetic drum memories, it is often desirable to intitally store selected information in a predetermined area of the drum memory. Such information may, for example, comprise certain routines or subroutines which are intermittently used to control operations in the computer system. After initial storage of this information, it is necessary that the information in the predetermined areas of the magnetic drum be protected against either accidental change, or change caused by a component failure.

In a drum memory system, the information storage areas are divided into a plurality of tracks or channels encircling the periphery of the magnetic drum. Each drum channel has associated with it a magnetic head which is connected to a write amplifier or switching device and employed to write information on the corresponding drum channel. Each magnetic head is also connected to a read amplifier and employed to read information from the corresponding drum channel. Protection of information in predetermined channels or tracks of a drum memory system has previously been accomplished by electrically disconnecting selected magnetic heads from the corresponding write amplifier or switching devices. This prior art method of protecting against modification of information in predetermined channels of a magnetic drum memory system is expensive, since a large amount of additional wiring is required in the circuitry associated with the magnetic heads. In addition, the additional wiring introduces additional capacitance into the circuitry which degrades the high frequency characteristics of the drum memory system. Accordingly, it is desirable to provide an arrangement for protecting information stored in predetermined areas of a moving magnetic medium which avoids these problems.

It is therefore, an object of this invention to provide an improved arrangement for protecting information stored in a predetermined area of a moving magnetic record medium.

It is another object of this invention to provide improved apparatus for selectively preventing the writing of information on a predetermined area of a moving magnetic record medium.

It is another object of this invention to provide memory protection apparatus in a drum memory system requiring minimum modification of the drum memory system.

It is another object of this invention to obtain improved high frequency electrical characteristics in a drum memory system including memory protection apparatus.

It is a further object of this invention to provide improved low-cost apparatus for selectively preventing the transfer of information to one or more channels of a magnetic drum.

SUMMARY

The foregoing objects are achieved, in the illustrated embodiment of the invention, by connecting a plurality of memory protection circuits, each of which includes a serially-connected protection switch, between the write current sources and the column selection switches of a magnetic drum memory system. Each of the memory protection circuits is connected between the write current sources and one of the column selection switches in parallel with the magnetic heads connected to that column selection switch. Upon selection of a given magnetic head by row and column selection switches of the magnetic drum memory system, transmission of current from one of the current sources through the appropriate row selection switch to the magnetic head to store binary information on the corresponding drum channel occurs only if the protection switch in the memory protection circuit connected to that column is open. If the protection switch is closed, a low-impedance path for current flow from the current sources is provided through the protection switch and the column selection switch, and no current flows through the row selection switch and the magnetic head. Each protection switch, when closed, thus prevents the transfer of binary information through the magnetic heads connected to the corresponding column selection switch and protects the information previously stored in the corresponding drum channels.

The subject matter of the invention is particularly pointed out and distinctly claimed in the concluding portion of the specification. The invention, however, both as to organization and method of operation, may best be understood by reference to the following description taken in connection with the accompanying drawings.

DESCRIPTION OF AN ILLUSTRATIVE EMBODIMENT

Figures 1, 2:
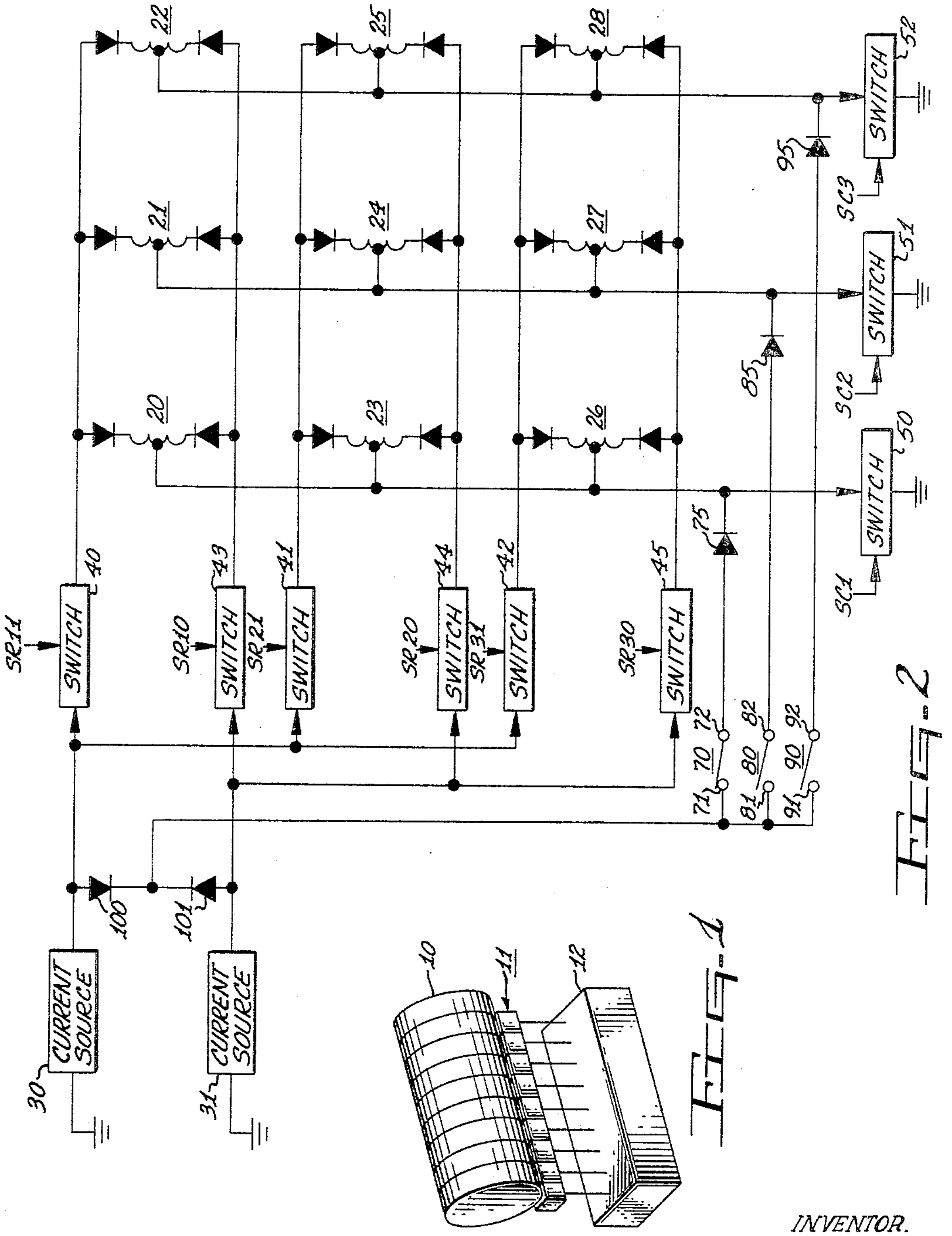
FIGURE 1 is a diagram illustrating a magnetic drum memory system.
FIGURE 2 is a circuit diagram illustrating a magnetic drum memory system incorporating the protection apparatus of the invention.

Referring to FIGURE 1, there is illustrated a magnetic drum memory system including a memory record medium comprising drum 10. Transducers in the form of fixed magnetic heads 11, rigidly fixed in position relative to drum 10 are mounted adjacent drum 10 with a small air gap between magnetic heads 11 and the drum surface. As the drum rotates, circumferential bands of drum surface, called channels or tracks, pass adjacent magnetic heads 11. Each of magnetic heads 11 records or writes binary information in the form of magnetic flux patterns on the drum channel corresponding to that magnetic head. Each of magnetic heads 11 may also be used to detect or read the binary information represented by flux patterns previously recorded on the corresponding drum channel.

Apparatus for selectively controlling the read or write function of each of magnetic heads 11 is symbolically illustrated at 12. Apparatus 12 also includes the necessary electronic circuitry for providing current flow through a selected magnetic head during a write operation to store binary information on the corresponding drum channel. In addition, apparatus 12 receives signals representing the binary information stored on a drum channel when the corresponding magnetic head is performing a read function. In FIGURE 1, drum 10 is shown to have nine channels and nine magnetic heads are employed to read binary information from and write binary information on these channels. A magnetic drum memory system may, however, have any selected number of channels with a corresponding number of magnetic heads.

FIGURE 2 illustrates in detail the magnetic heads of FIGURE 1, the electronic circuitry connected to the magnetic heads for writing binary information on the surface of drum 10 and the protection apparatus of the invention. Referring to FIGURE 1, the nine magnetic heads illustrated in FIGURE 1 are identified by reference numerals 20 through 28 inclusive. Each of the magnetic heads 20–28 comprises a center-tapped winding, as illustrated. When a current is passed from one end of the winding through the corresponding half of the winding to the center tap, a flux of one polarity or direction is generated in the magnetic head. This flux extends across the air gap to the drum channel adjacent to that magnetic head and produces a corresponding magnetic effect on the adjacent magnetizable surface of the associated drum channel. Similarly, when a current is passed from the other end of the winding through the corresponding half of the winding to the center tap, a magnetic flux of opposite polarity or direction is generated to produce a corresponding magnetic effect upon the adjacent magnetic surface of the associated drum channel. In one well known method of recording, current is continually passed from either one of the winding ends to the center tap to generate a magnetic flux field. A steady flux field represents a binary zero in the sequence of binary information being written on the drum channel. A binary 1 in the sequence is represented by a reversal of the magnetic flux from either of its two possible directions.

Current sources 30 and 31 in FIGURE 2 act as signal source means and provide currents which are made to flow through either one or the other half of the winding of a selected magnetic head to the center tap of the winding and thence to ground. Circuits which function as constant current sources are well known in the art. The output of current source 30 is applied to switches 40, 41 and 42 while the output of current source 31 is applied to switches 43, 44 and 45, as illustrated in FIGURE 2. Switches 40 and 43 are connected to opposite ends of the winding of each of magnetic heads 20, 21 and 22. Switches 40 and 43 are termed the row selection switches for the row of magnetic heads 20, 21 and 22. Only one of the pair of row selection switches 40 and 43 is actuated at a given time when binary information is being applied to one of magnetic heads 20, 21 and 22 in the corresponding row.

Figure 3:
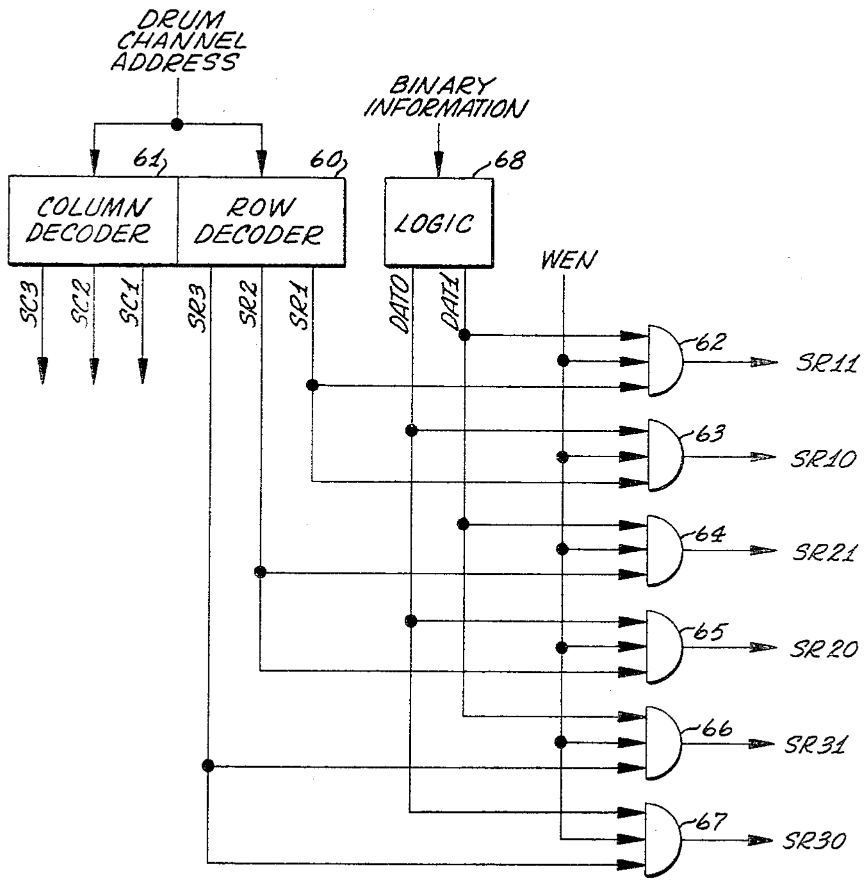
FIGURE 3 is a block diagram illustrating the generation of the row and column selection signals applied to the circuit of FIGURE 2.

The actuation of row selection switches 40 and 43 is controlled by row selection signals SR11 and SR10 respectively. In response to signal SR11, switch 40 permits current from current source 30 to flow through the upper half of the winding of one of magnetic heads 20, 21 and 22 to the center tap of the winding. In response to signal SR10, switch 43 permits current from current source 31 to flow through the lower half of the winding of one of magnetic heads 20, 21 and 22 to the center tap of the winding. Circuits for performing the functions of row selection switches 40 and 43 are well known in the art. Circuitry for generating signals SR11 and SR10 is illustrated in FIGURE 3.

Row selection switches 41 and 44 are connected to the opposite ends of the winding of each of magnetic heads 23, 24 and 25. Switches 41 and 44 perform the same functions as switches 40 and 43 and permit current flow through a selected half of the winding of one of magnetic heads 23, 24 and 25 when binary information is to be transferred through one of the magnetic heads to the corresponding drum channel. Switches 41 and 44 are actuated in response to row selection signals SR21 and SR20 respectively.

Row selection switches 42 and 45 are connected to the opposite ends of the winding of each of magnetic heads 26, 27 and 28. Switches 42 and 45 are responsive to row selection signals SR31 and SR30 respectively to permit current flow from one of the current sources 30 and 31 through the corresponding half of the winding of one of magnetic heads 26, 27 and 28 when a magnetic representation of binary information is to be transferred by means of the magnetic head to the corresponding drum channel.

Switches 50, 51 and 52 are each connected to the center taps of the windings of selected ones of magnetic heads 20–28 and function as column selection switches. As illustrated in FIGURE 2, one terminal of column selection switch 50 is connected to the center tap of the winding of each of magnetic heads 20, 23 and 26. The other terminal of switch 50 is connected to ground to provide a return path for the current from current sources 30 and 31. Column selection switch 50 is actuated in response to column selection signal SC1 which is provided by the circuitry illustrated in FIGURE 3.

One of the terminals of column selection switch 51 is connected to the center tap of the winding of each of magnetic heads 21, 24 and 27, the other terminal of switch 51 being connected to ground. Switch 51 is actuated in response to column selection signal SC2. Column selection switch 52 is similarly connected between ground and the center tap of the winding of each of magnetic heads 22, 25 and 28. Switch 52 is actuated in response to column selection signal SC3. Circuits for performing the functions of column selection switches 50, 51 and 52 are well known in the art.

FIGURE 3 illustrates apparatus for generating the row selection signals SR11, SR10, SR21, SR20, SR31 and SR30 and the column selection signals SC1, SC2 and SC3 to thereby provide a signal path for the signals provided by the current sources 30 or 31 through a selected one of the transducers. Referring to FIGURE 3, a drum channel address identifying the drum channel on which binary information is to be recorded is applied to row decoder 60 and column decoder 61. In response to the drum channel address, row decoder 60 generates one of the signals SR1, SR2 and SR3. Signal SR1 indicates that the write operation is to be performed by one of the magnetic heads in the row comprising magnetic heads 20, 21 and 22. Signal SR2 indicates that the write operation is to be performed by one of the magnetic heads of the row comprising magnetic heads 23, 24 and 25. Signal SR3 indicates that the write operation is to be performed by one of the magnetic heads in the row comprising magnetic heads 26, 27 and 28. Circuits for performing the functions of row decoder 60 are well known in the art.

Signal SR1 is applied to AND-gates 62 and 63. Signal SR2 is applied to AND-gates 64 and 65 while signal SR3 is applied to AND-gates 66 and 67. Logic 68 receives in sequence the binary digits comprising the binary information to be recorded on the drum and provides signal DAT1 to AND-gates 62, 64 and 66 and signal DAT0 to AND-gates 63, 65 and 67. Signals DAT0 and DAT1 are complementary binary signals and the logic states of signals DAT0 and DAT1 are reversed each time a binary digit in the serial binary information applied to logic 68 comprises a binary 1. The reversals in the logic states of signals DAT0 and DAT1 cause a change in the magnetic flux pattern generated by the selected magnetic head and a corresponding change in the flux pattern induced on the surface of the drum channel. Each of gates 62–67 also receives signal WEN, which indicates that a write, as opposed to a read, operation is to be performed in the magnetic drum memory system. Thus, AND-gate 62 is enabled and row select signal SR11 generated in response to signal SR1 from row decoder 60, signal WEN indicating a write operation and signal DAT1 from logic 68. When the binary information to be recorded comprises a binary 1, logic 68 reverses the state of signals DAT0 and DAT1, causing gate 62 to be disabled and gate 63 to be enabled and row selection signal SR10 to be generated. Row selection signals SR21 and SR20 are similarly generated in response to output signal SR2 of row decoder 60 while row selection signals SR31 and SR30 are similarly generated in response to output signal SR3 of row decoder 60.

In response to the drum channel address, column decoder 61 generates one of column selection signals SC1, SC2 and SC3. Signal SC1 indicates that a write operation is to be performed by one of the magnetic heads in the column comprising magnetic heads 20, 23 and 26. Signal SC2 indicates that a write operation is to be performed by one of the magnetic heads in the column comprising magnetic heads 21, 24 and 26. Signal SC3 indicates that a write operation is to be performed by one of the magnetic heads in the column comprising magnetic heads 22, 25 and 28. Circuits for performing the functions of column decoder 61 are well known in the art.

In operation, the single row selection signal and a single column selection signal are generated by the apparatus of FIGURE 3 and applied to the appropriate row and column selection switches illustrated in FIGURE 2 to actuate a corresponding row selection switch and a corresponding column selection switch. The one of the pair of row selection switches which is actuated at a given time is dependent upon the binary information to be recorded. The actuation of a single row selection switch and a single column selection switch provides a current path from one of current sources 30 and 31 through a selected half of the winding of the selected magnetic head to generate a corresponding flux pattern for transfer of binary information to the corresponding drum channel.

In accordance with the invention, the transfer of binary information through a predetermined magnetic head to the corresponding drum channel is prevented by providing memory protection circuits including protection switches 70, 80 and 90, as illustrated in FIGURE 2. Terminals 71 of switch 70, 81 of switch 80 and 91 of switch 90 are each connected to current source 30 through isolation diode 100 and to current source 31 through isolation diode 101. Terminal 72 of switch 70 is connected through isolation diode 75 to the center taps of the windings of magnetic heads 20, 23 and 26 and to the corresponding terminal of column selection switch 50. Terminal 82 of protection switch 80 is connected through isolation diode 85 to the center taps of the windings of magnetic heads 21, 24 and 27 and to the corresponding terminal of column selection switch 51. Terminal 92 of protection switch 90 is connected through isolation diode 95 to the center taps of the windings of magnetic heads 22, 25 and 28 and to the corresponding terminal of column selection switch 52. Switches 70, 80 and 90 may be any type of switch which permits selective connection of its normally electrically separate terminals. One suitable type of switching arrangement is illustrated in FIGURE 4.

Figure 4:
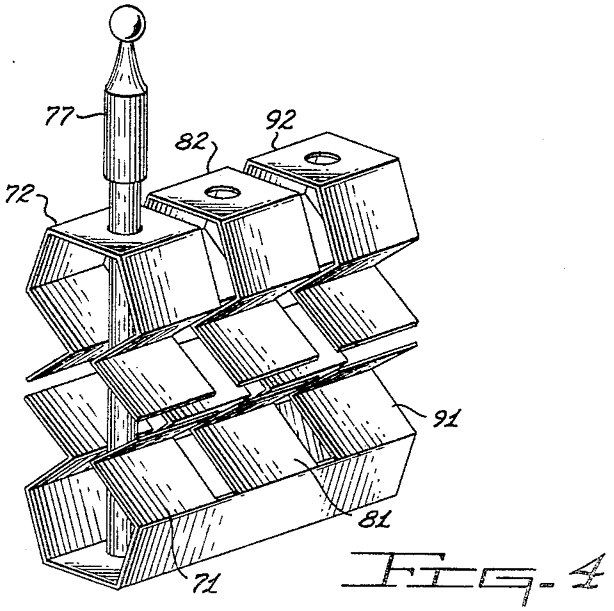
FIGURE 4 is a diagram illustrating switch apparatus which may be employed in the protection apparatus of the invention.

Referring to FIGURE 4, terminals 71, 81 and 91 of switches 70, 80 and 90 respectively comprise contacts of a contact strip, each contact in the contact strip being electrically connected to the other contacts of the strip through the base of the strip. Terminals 72, 82 and 92 comprise electrically isolated contacts positioned above the contact strip, as illustrated. Selective interconnection of terminal 72 with terminal 71 is effected by insertion of conductive shorting pin 77, as illustrated. Selective interconnection of terminals 82 and 81 and of terminals 92 and 91 is similarly effected by insertion of similar shorting pins.

Protection against modification of the binary information in selected drum channels is accomplished, in accordance with the invention, by selective closure of protection switches 70, 80 and 90. Closure of one of these switches provides a low impedance current path in parallel with the windings of the magnetic heads of the corresponding column, preventing current flow through these magnetic heads. Referring to FIGURE 2, upon closure of protection switch 70, the current from current sources 30 and 31 will flow through switch 70 and through column selection switch 50 to ground even though one of the row selection switches 40–45 and column selection switch 50 are accidentally or inadvertently actuated, thereby preventing transfer of information through any of magnetic heads 20, 23 and 26 to the corresponding drum channels. Similarly, if protection switch 80 is closed, current flow in magnetic heads 21, 24 and 27 is prevented, even though current flow through one of these magnetic heads is enabled by actuation of column switch 51 and one of the row of selection switches. Protection switch 90, when closed, similarly prevents current flow through any of the magnetic heads 22, 25 and 28 connected to column selection switch 52 and transfer of binary information to the corresponding drum channels.

The protection arrangement of the invention permits the system operator to insure positive protection of previously stored information. A minimum of wiring is required to implement the protection arrangement. In addition, the protection circuitry is separate from the magnetic head structures. Stray capacitance is thus minimized, preventing degradation of the high frequency characteristics of the memory system. Although the invention has been illustrated in the environment of a drum memory system, the invention is applicable to other types of memory systems.

While the principles of the invention have now been made clear in an illustrative embodiment, there will be immediately obvious to those skilled in the art many modifications in structure, arrangement, proportions, elements, materials, and components used in the practice of the invention and otherwise, which are particularly adapted for specific environments and operating requirements, without departing from these principles.

What is claimed is:

1. In a magnetic memory system including a moving record medium having a plurality of information storage channels, the combination comprising: a plurality of transducers, each of said transducers being associated with one of the storage channels of the record medium and responsive to information signals for transferring information represented by the information signals to the corresponding storage channel of the record medium, selection means connected to said plurality of transducers for selectively providing information signals and a signal path for the information signals through different predetermined ones of said transducers, protection means connected in parallel with said plurality of transducers and portions of said selection means for selectively providing a low impedance signal path for the information signals in parallel with predetermined ones of said transducers to prevent transfer of the information represented by the information signals to the corresponding storage channels of the record medium.

2. The combination of claim 1 in which said protection means comprises at least one serially connected switching device.

3. The combination of claim 2 in which said protection means includes at least one switch connected in series with an isolating diode.

4. The combination of claim 1 in which said protection means comprises a plurality of switching means, each of which is connected in parallel with predetermined ones of said transducers.

5. In a magnetic memory system including a moving record medium having a plurality of information storage channels, the combination comprising: a plurality of transducers, each of said transducers being associated with one of the storage channels of the record medium and responsive to signals for transferring information represented by the signals to the corresponding storage channel of the record medium, signal source means for providing the signals, a plurality of first selection means for receiving the signals provided by said signal source means, each of said first selection means being connected to a plurality of different ones of said transducer means, a plurality of second selection means, each of said second selection means being connected to a plurality of different ones of said transducer means, each of the transducer means connected to a predetermined one of said second selection means being connected to a different one of said first selection means, means for causing one of said first and one of said second selection means to provide a signal path for the signals provided by said signal source means through a selected one of said transducers, a plurality of protection means individually connected between said signal source means and a different one of said second selection means, each of said protection means being selectively actuated to provide a low impedance signal path for the signals provided by said signal source means in parallel with the transducers connected to the corresponding second selection means to prevent transfer of information to the corresponding storage channels of the record medium.

6. In a magnetic memory system including a moving record medium having a plurality of information storage channels for storage of information, the combination comprising: a plurality of transducers, each of said transducers being associated with one of the storage channels of the record medium for transferring information representations to the corresponding channel of the record medium in response to current flow through said transducer, current source means for supplying a current, a plurality of row selection switches connected to said current source means, a plurality of column selection switches, means connecting each of said transducers in series between a different pair of said row and column selection switches to provide a current path from said current source means through the selected transducer upon actuation of the pair of switches, protection circuit means connected to said current source means and to said column selection switches in parallel with said transducers, and means included in said protection circuit means for selectively providing a low impedance current path from said current source means in parallel with predetermined ones of said transducers to prevent transfer of information from said predetermined ones of said transducers to the moving record medium.

7. In a magnetic memory system including a moving magnetic record medium having a plurality of information storage channels, the combination comprising: a plurality of transducers, each of said transducers being associated with one of the storage channels of the record medium for transferring magnetic information representations to the corresponding storage channel of the record medium in response to current flow through said transducer, current source means for supplying a current, a plurality of a row selection switches, each of said row of selection switches being connected to said current source means and to predetermined ones of said transducers for applying, when enabled, current from said current source means to the corresponding transducers, a plurality of column selection switches each having first and second terminals, means connecting each of said first terminals to predetermined ones of said transducers, each of said transducers connected to one of said first terminals being connected to a different one of said row selection switches, means connecting each of said second terminals to said current source means, selection means for selectively enabling one of said row selection switches and one of said column selection switches to provide a current path from said current source means through the selected transducer, a plurality of protection circuit means, each of said protection circuit means being connected between said current source means and the first terminal of a different one of said column selection switches, each of said protection circuit means including switch means for selectively providing a low impedance current path from said current source means through the corresponding column selection switch to prevent current flow through the transducers connected to the corresponding column selection switch and storage of information on the corresponding storage channels.

8. The combination of claim 7 in which each of said protection circuit means includes an isolating diode connected in series with said switch means.

References Cited

UNITED STATES PATENTS

| | | | |
|---|---|---|---|
| 3,119,095 | 1/1964 | Hansen | 340—166 |

STANLEY M. URYNOWICZ, Jr., Primary Examiner

W. F. WHITE, Assistant Examiner

U.S. Cl. X.R.

340—166, 174